United States Patent [19]

van de Moesdijk et al.

[11] 3,962,139
[45] June 8, 1976

[54] CATALYST PREPARATION

[75] Inventors: Cornelis G. M. van de Moesdijk, Elsloo; Joseph J. F. Scholten, Sittard; Jacobus J. M. G. Eurlings, Valkenburg, all of Netherlands

[73] Assignee: Stamicarbon B.V., Geleen, Netherlands

[22] Filed: Nov. 28, 1973

[21] Appl. No.: 419,883

[30] Foreign Application Priority Data
Nov. 30, 1972 United Kingdom............... 55448/72

[52] U.S. Cl................................ 252/463; 75/.5 A; 252/466 PT; 252/472; 252/474
[51] Int. Cl.²......................................... B01J 23/08
[58] Field of Search............. 252/466 PT, 463, 472, 252/474; 75/.5 A

[56] References Cited
UNITED STATES PATENTS

| | | | |
|---|---|---|---|
| 2,906,700 | 9/1959 | Stine et al.................. | 252/466 PT X |
| 3,278,608 | 10/1966 | Clement.................... | 252/466 PT X |
| 3,415,737 | 12/1968 | Kluksdahl................. | 252/466 PT X |
| 3,558,477 | 1/1971 | Kluksdahl................. | 252/466 PT |
| 3,617,518 | 11/1971 | Sinfelt et al.............. | 252/474 X |
| 3,759,823 | 9/1973 | Davies et al.............. | 252/466 PT X |
| 3,785,960 | 1/1974 | Merrill et al............. | 252/466 PT |

*Primary Examiner*—Helen M. S. Sneed
*Attorney, Agent, or Firm*—Cushman, Darby & Cushman

[57] ABSTRACT

Powdery alloys of two or more metals, as well as alloys distributed in finely divided state over a carrier material, e.g., catalysts consisting of an alloy of two or more metals, are obtained by adding one of the metals as a powder or in finely divided state on a carrier to a liquid which contains a dissolved compound of the metal or dissolved compounds of the metals to be alloyed, whereupon the metal particles are treated with a reducing agent.

In this way an alloy is formed without the risk for sintering of the formed alloy particles.

14 Claims, No Drawings

CATALYST PREPARATION

The invention relates to the preparation of powdery alloys of two or more metals, as well as to the preparation of alloys distributed in finely divided state over a carrier material. The invention relates in particular to a process for preparing catalysts whose principal catalytically active component consists of an alloy of two or more metals.

Catalysts are known whose catalytically active component consists of an alloy. These alloys are as a rule those whose active component is distributed over a porous carrier material. They are prepared by impregnating the porous carrier material with solutions of two or more salts and by subsequently drying, calcining and reducing the mass. Another known process consists in the application of ion exchange or in the successive precipitation or the co-precipitation of insoluble metal compounds from a usually aqueous solution of the metal salts on a carrier material, as a rule followed by pyrolysis, oxidation and reduction of the precipitated compound(s) under conditions of such a nature that the formation of alloys is promoted. An example thereof is given by the Netherlands patent application No. 7,105,986 laid open to public inspection on Nov. 8, 1971.

Catalysts of this kind, whose principal catalytically active component is an alloy, are of great importance for the industrial application of catalysis. Examples of processes in which this type of catalysts considerably improves the activity, the selectivity, the regenerability and the lifetime, as compared with mono-metallic catalysts, are found in the following fields of industrial application: reforming, isomerization, hydrodimerization, hydrogenation, alkylation, cracking, dehydrocyclization, oxidation and cyclization.

In Advances in Catalysis, Acad. Press, New York and London, Vol. 22, pages 115 to 189 incl., Moss, R.L., and Whalley, L., explain in detail the advantages of such catalysts for numerous reactions. Other advantages are mentioned, amongst others, in the U.S. Pat. No. 3,415,737 for cracking and reforming crude hydrocarbons, and in the U.S. Pat. No 3,617,518 for the selective hydrogenation of olefins and alkynes.

Well-known combinations, according to the U.S. Pat. No. 3,617,518, are, for instance, alloys of noble metals from Group VIII of the Periodic System of Elements with metals from Group IB; other combinations are, for instance, alloys of noble metals from Group VIII with bismuth, cadmium, germanium, indium, cobalt, mercury, lead, molybdenum, nickel, rehenium, technetium, thallium, tin, tungsten or iron.

Disadvantages attaching to the preparational methods so far applied for said catalysts:
1. high temperatures must be applied to make sure that a homogeneous alloy is formed. In practically all cases calcination and reduction temperatures of 500 °C or higher are necessary;
2. at these high temperatures, the catalytically active component often becomes sintered. The attending loss of active surface area is disadvantageous in particular to the catalytic activity;
3. in most cases it is not certain that complete formation of alloy has indeed occured, because the particles to be alloyed may be present on the carrier material at such a large relative distance that approach between the particles during the homogenization period, followed by sintering, cannot come about;
4. if a powdery alloy is prepared in the absence of a carrier material, the high homogenization temperatures will cause the accessible active surface area to become even smaller than it usually is in the case of mono-metallic powders;
5. preparation is rather complex since a relatively large number of preparational steps are necessary, like the successive impregnation, drying, pyrolysis, calcination and reduction steps.

The object of the invention is to provide a process for preparing powdery alloys of two or more metals and similar alloys, which are distributed in finely divided state over a whether or not porous carrier material, in which said disadvantages do not occur. The object of the invention is in particular to form the alloys at a low temperature with substantial simplification of the preparational technology.

According to the invention this is achieved if one of the metals, as a powder or in finely divided state on the carrier material, is added to a liquid at a temperature of up to the boiling point of the liquid at the prevailing pressure, in which liquid a compound of the metal to be alloyed, or compounds of metals to be alloyed, is/are present in dissolved state, whereupon the metal particles are contacted with a reducing agent.

The metal, added to the liquid as a powder or in finely divided state on the carrier material, is preferably chosen from the metals of Group VIII and Group IB of the Periodic System.

Where mention is made of one of the metals as a starting material, also a powdery alloy already formed or an alloy in finely divided state on a carrier may be meant. Where mention is made of a compound of the metal to be alloyed in dissolved state, also a compound of a metalloid may be meant.

The powdery metal or the metal present on a carrier material in finely divided state will be dispersed in the liquid preferably by agitation, like stirring, by vibration or in another way. This metal will hereafter be referred to as the 'dispersed metal,' although dispersion is not always necessary. The metal or the metalloid dissolved in the liquid as a compound, will hereafter be referred to as 'metal to be alloyed.'

As a reducing agent, a reducing gas will be used by preference, such as hydrogen gas. The hydrogen gas quantity may be small, for instance 100 ml of hydrogen/hour/gram of dissolved metal. Other reducing gases, like carbon monoxide, inert gases containing hydrogen, or hydrogen in statu nascendi, are also usable. Hydrogen in statu nascendi can be generated in situ, for instance by application of electrolysis. Reducing liquids, such as hydrazine, are not excluded. Preferably, the reducing gas will be passed through the liquid and contacted with the dispersed metal, in finely divided state in the form of bubbles, in which advantage is achieved if the bubbles are further reduced by stirring and the diffusion-transfer from the gas to be solid is accelerated.

For the liquid, aqueous solutions will be used as a rule, although organic liquids, in which the compounds of the metals to be alloyed are sufficiently soluble, may sometimes be preferable, for instance an alcoholic solution of compounds of antimony, bismuth or zinc.

The pH-value of the solution depends on the nature of the metals to be combined, both of the dispersed metal and of the metal compounds dissolved in the liquid. At too low a pH-value there is a risk of the dispersed metal becoming wholly or partly dissolved; at too high a pH-value there is a possibility that no or too slow an alloyage takes place. From case to case there exists a preferential value for the pH at which the contemplated alloying process proceeds in an optimum manner without too large a quantity of one or several metals being kept in solution or being dissolved. In the case of catalysts containing gold, iridium, copper, osmium, palladium, platinum, rhodium, ruthenium or silver, with antimony, cadmium, cobalt, gallium, germanium, gold, indium, cobalt, copper, mercury, lead, molybdenum, nickel, rhenium, technetium, tellurium, thallium, tin, tungsten, iron or silver as a second or as a third metal, a pH value of between 1 and 5 produces good results. By preference, the acid medium will contain the usual strong acids, such as sulphuric acid, nitric acid, hydrochloric acid, phosphoric acid or formic acid, but weak acids, like acetic acid, are not excluded.

It may be advisable in some cases to buffer the solution, especially if there is a risk that at too low a pH value the dispersed material may become dissolved to an excessive degree.

Advantages of the present process are amongst others:

1. the alloy is formed at such a low temperature that sintering of the formed alloy particles does not take place, as a result of which a high degree of dispersion, or, accessible surface area, is maintained;
2. all ratios in the composition of the alloy are easily controllable by the chosen reaction time, the temperature and the pH value of the liquid, in which the absorbed quantity of metal can be followed by analytically observing the decrease in concentration of the dissolved metal compound as a function of the time;
3. the alloy can be allowed to form in such a way that only a surface-alloy in one or more atomic layers is obtained;
4. if desired, two metals can at the same time be alloyed with the dispersed metal, or a dispersed alloy be provided with a third metallic component;
5. for the very reason of the particles remaining extremely small owing to the low temperature of the process, for instance smaller than 15 A, alloys can be formed that cannot exist in larger particle sizes or can exist only in a restricted range of component ratios, see C & EN, July 3, 1972, pages 18 and 19.

For the metal to be dispersed one can start, for instance, from platinum black, palladium black or another finely divided metal which can be easily dispersed in the liquid, if necessary with agitation.

The metal to be alloyed, respectively the metals, is/are present in the liquid in the form of a soluble compound. The form of the compound may differ greatly. Sometimes salts are concerned, like antimony trichloride, antimony trifluoride, cadmium nitrate, gallium sulphate, gold chloride, indium sulphate, mercury nitrate, tellurium nitrate, tin dichloride or silver nitrate; sometimes an acid salt, such as disodium hydrogen arsenate, sometimes an acid like rhenium acid, sometimes a soluble oxide, such as germanium oxide, copper oxide or lead oxide. It is not necessary that said compounds are wholly dissolved in the liquid; during the treatment the undissolved part will as yet dissolve because the dissolved portion is continuously alloyed with the dispersed metal.

When the dispersed metal is present in the form of fine particles on a carrier which is also in finely divided state, the loaded carrier material can be dispersed in the liquid. In the case of larger carrier particles, like extrudates, small lumps, pills and similar formed catalyst elements known in the technical catalysis, these elements can be kept dispersed in the liquid with agitation, but if this should not be desirable because of little mechanical strength, or if they should have little resistance to abrasion, the elements can be left in the liquid in precipitated condition. In this case, the reducing gas will preferably be led in finely divided state through the bed of the elements. It may be useful then to keep the liquid over the elements in motion.

The period of time required to cause the alloyage to take place depends on various factors. According as the total surface area of the dispersed metal per unit of weight is larger, the alloying process will proceed more rapidly. The influence of the pH value has already been discussed above. Of great importance, of course, is the temperature at which the process is carried out. All factors accelerating the transfer of reducing gas to the gas-liquid interface are of importance, such as the pressure of the gas over the liquid and the solubility of the gas in the liquid, the dispersion of the gas bubbles in the liquid and the degree to which the transfer of ions in the interface layer between the solid phase and the gas phase is accelerated by the agitation.

From the foregoing it will be clear that, when the reducing gas is passed over, the reaction time will be extraordinarily long if the solution of the metal compound is impregnated in a porous carrier body containing metal.

In some cases, the dissolved metal compound to be alloyed will be rapidly adsorbed out of the solution onto the solid phase (carrier and/or dispersed metal) under the influence of adsorption forces. In that case the alloying process will not take place directly, the treatment with the reducing gas having to be continued until, for instance with the aid of X-ray analysis, it appears that the alloy has formed indeed.

The process according to the invention can also be carried out by forming the dispersed metal in situ in the liquid and by simultaneously alloying it with another metal or with other metals.

EXAMPLE 1

Preparation of a ruthenium-germanium alloyage-catalyst 500 mg of ruthenium black — obtained by reduction of ruthenium oxide p.a. — having an active surface area of 5.9 $m^2$/gram were dispersed, with intensive stirring, in 150 $cm^3$ of distilled water which had been acidified with 5 $cm^3$ of glacial acetic acid to a pH value of 2.5. To this suspension 152 mg of germanium dioxide were added. Subsequently, at a temperature of 80°C, hydrogen gas in the form of bubbles, the bubbles, having a diameter of 2 to 3 mm, was passed through in a quantity of 150 ml/hour per gram of dissolved metal, in a glass vessel which was equipped with a stirrer making 1400 revolutions per minute and which was internally provided with baffles in order to obtain a good stirring effect. Said bubble size was reduced even further by intensive stirring.

It was established analytically that 20 % of the germanium had disappeared from the solution after 100 hours. The analysis of the resulting alloyage-catalyst, which had been filtered off, washed out with water and acetone and dried at 120 °C, showed that said 20 % of germanium had been taken up integrally in the ruthenium lattice. X-ray analysis showed that a surface-alloy of germanium and ruthenium had formed on the ruthenium.

Calculation proved that, statistically, about 6 monolayers of germanium had been taken up by the ruthenium lattice.

EXAMPLE 2

Preparation of a ruthenium-rhenium alloyage-catalyst

Analogously with the procedure according to example 1, 105 mg of rhenium were alloyed with 500 mg of ruthenium. A solution was started from of 142 mg of perrhenic acid in distilled water which had been acidified with 5 cm$^3$ of glacial acetic acid to a pH value of 2.5.

After treatment for 24 hours in accordance with the description of example 1, the color of the suspension appeared to have changed from greyish black to deep reddish-brown. It was established analytically that all rhenium had disappeared from the solution and had been integrally taken up by the ruthenium. X-ray analysis proved that an alloy had formed containing 90 atomic % of ruthenium and 10 atomic % of rhenium.

EXAMPLE 3

Preparation of an alloyage-catalyst containing 0.3 % by weight of palladium and 0.3 % by weight of germanium on an alumina carrier 1.8 cm$^3$ of a concentrated 33 % hydrochloric acid solution and 500 mg of palladium-chloride were dissolved in 150 cm$^3$ of distilled water. With the aid of this solution 100 grams of gamma-aluminum oxide particles having an average diameter of 3 mm and an active surface area of 190 m$^2$ per gram were impregnated. After filtering off, drying at 120 °C, calcining for 2 hours at 300 °C in air and reducing at 300 °C in nitrogen gas containing 7 % by volume of hydrogen, a catalyst containing 0.3 weight % of palladium was obtained.

Analogously with the procedure described in example 1, 0.3 % by weight of germanium was alloyed with the palladium particles, starting from this catalyst.

EXAMPLE 4

Preparation of a palladium-germanium alloyage-catalyst

Palladium black having an active surface are of 4 m$^2$/gram was started from. By means of the treatments, analogous with those described in example 1, a palladium-germanium alloy was prepared in about 50 hours which contained 50 atomic % of germanium. By X-ray analysis the presence of the metallic compound Pd$_2$Ge was established.

EXAMPLE 5

Preparation of a palladium-antimony alloyage-catalyst 3.84 grams of tartar emetic were dissolved in 1,000 cm$^3$ of distilled water. 2.5 grams of palladium black were dispersed in the solution. Subsequently, the solution was acidified with approximately 2 cm$^3$ of concentrated phosphoric acid to a pH value of 1.0, whereupon hydrogen was passed through for 48 hours at a temperature of 60 °C. After the mass had been filtered off and dried, X-ray analysis proved that no palladium was present any more and that an alloy had formed of the composition Pd$_3$Sb.

EXAMPLE 6

Preparation of an alloyage-catalyst containing 0.2 % by weight of platinum, 0.1 % by weight of palladium and 0.3 % by weight of germanium on a porous alumina carrier Analogously with the procedure described in example 3, 100 grams of porous aluminum oxide having an active surface area of 190 m$^2$/gram were impregnated with a hydrochloric acid solution of palladium-chloride and platinum-chloride. After filtering off, drying at 120 °C, calcining for 2 hours at 300 °C in air and reducing at 300 °C in nitrogen containing 7 % by volume of hydrogen, a catalyst containing 0.2 % by weight of platinum and 0.1 % by weight of palladium on an alumina carrier was obtained.

Analogously with the procedure described in example 1, 0.3 % by weight of germanium was alloyed with the alloyage particles already present, starting from this catalyst.

EXAMPLE 7

Preparation of a palladium-germanium alloyage-catalyst 5 grams of palladium-black were dispersed in 750 cm$^3$ of distilled water in which, subsequently, 3 grams of hexagonal germanium dioxide were dissolved. The pH value was adjusted to 2 by addition of acetic acid. With intensive stirring, finely divided hydrogen was passed through a temperature of 80 °C. After 70 hours, all metal ions had alloyed with the palladium. The resulting finely divided alloyage powder consisted to 70 % by weight of palladium and to 30 % by weight of Ge.

What is claimed is:

1. Process for preparation of powdery alloys of two or more metals, which are catalysts whose catalytically active component consists of an alloy of two or more metals, this process being characterized in that one of the metals is, as a powder or in the finely divided state on a carrier material, added to a liquid acidic medium of a pH between 1 and 5 at a temperature of up to the boiling point of the medium at the prevailing pressure, and is gold, iridium, copper, osmium, palladium, platinum, rhodium, ruthenium or silver, which medium contains a dissolved compound of at least one other metal to be alloyed whereupon the metal particles are contacted with a reducing gas or reducing liquid said other metal being germanium, rhenium or antimony.

2. Process according to claim 1, characterized in that hydrogen gas is used as a reducing agent.

3. Process according to claim 1, characterized in that water is used as a liquid.

4. Process according to claim 1, characterized in that an organic liquid is used as a liquid said liquid being an alcoholic solution.

5. The process of claim 1, comprising dispersing one of said metals which is a powder or in the finely divided state on a carrier metal, in an acidic medium at a temperature of up to the boiling point of the medium, said metal being gold, iridium, copper, osium, palladium, platinum, rhodium, ruthenium or silver; said acidic medium osmium, a compound of a second metal, to be alloyed with the first metal; and subsequently introducing a reducing agent to the solution, at said temperatures, whereby the second metal is integrally taken up into the lattice structure of the first metal.

6. A process for the preparation of powdery alloys of two or more metals which are catalysts whose catalytically active component consists of the alloy of two or more metals, comprising dispersing one of said metals which is a powder or in the finely divided state on a carrier metal, in an acidic medium at a temperature of up to the boiling point of the medium, said metal being of Group VIII of the Periodic System; said acidic medium containing a compound of a second metal, to be alloyed with the first metal; and subsequently introducing a reducing gas or reducing liquid to the solution, at said temperatures, whereby the second metal is integrally taken up into the lattice structure of the first metal, wherein the second metal is gold, iridium, copper, osmium, palladium, platinum, rhodium, ruthenium or silver.

7. The process of claim 6, wherein a third metal in the form of a compound is added to the acidic medium, wherein said third metal is antimony, cadmium, cobalt, gallium, germanium, gold, indium, copper, mercury, lead, molybdenum, nickel, rhenium, technetium, tellurium, thallium, tin, tungsten, iron or silver.

8. The process of claim 6, wherein the reducing agent is hydrogen gas.

9. The process of claim 6, wherein the first and second metals are ruthenium and germanium.

10. The process of claim 6, wherein the first and second metals are ruthenium and rhenium.

11. The process of claim 6, wherein the first and second metals are palladium and germanium.

12. The process of claim 6, wherein the first and second metals are palladium and antimony.

13. The process of claim 6, wherein the pH of the acidic medium is between 1 and 5.

14. A powdery alloy of two or more metals, prepared according to the process of claim 6.

* * * * *